United States Patent [19]

Linquist

[11] Patent Number: 5,000,363
[45] Date of Patent: Mar. 19, 1991

[54] CARRIER FOR TRANSPORTING OBJECTS ON A MOTOR VEHICLE

[76] Inventor: Phillip A. Linquist, 13521 NW. 29th Dr., West Des Moines, Iowa 50265

[21] Appl. No.: 395,642

[22] Filed: Aug. 18, 1989

[51] Int. Cl.⁵ ............................................. B60R 7/00
[52] U.S. Cl. ............................... 224/42.43; 224/42.07
[58] Field of Search .................... 224/42.43, 42.45 R, 224/42.03 R, 43.07, 42.05, 42.44, 42.08, 42.33

[56] References Cited

U.S. PATENT DOCUMENTS

| | | | |
|---|---|---|---|
| 27,170 | 6/1966 | Porter . | |
| 1,686,450 | 10/1928 | Henry | 224/42.44 |
| 2,106,503 | 1/1938 | Hendrick . | |
| 2,394,447 | 2/1946 | Hemp | 224/42.07 |
| 2,593,796 | 4/1952 | Riewerts | 224/42.44 |
| 3,378,182 | 4/1968 | McMiller . | |
| 3,606,111 | 9/1971 | Gjesdahl . | |
| 3,649,041 | 3/1972 | Cervantez | 224/42.44 |
| 3,854,641 | 12/1974 | Kohls . | |
| 3,858,775 | 1/1975 | Haas | 224/42.42 R |
| 3,905,481 | 9/1975 | Laterra | 211/60 SK |
| 4,078,708 | 3/1978 | Mayer . | |
| 4,785,980 | 11/1988 | Redick | 224/42.03 A |

*Primary Examiner*—Linda J. Sholl
*Attorney, Agent, or Firm*—Zarley, McKee, Thomte, Voorhees & Sease

[57] ABSTRACT

A carrier for objects which is particularly useful for transporting skis and elongated objects on motor vehicles is shown. A cross bar is shown having a first and second arm on each end extending rearwardly of the opposite ends of the cross bar. At least one leg is shown extending upwardly from the base formed by the cross bar and first and second arms, which can extend upward from each end of the first and second arms. In one embodiment, the device may be mounted to the trailer hitch of the motor vehicle by providing a hole centrally through the cross bar and passing a ball hitch through the hole in the cross bar and the hole in the trailer hitch tongue.

15 Claims, 1 Drawing Sheet

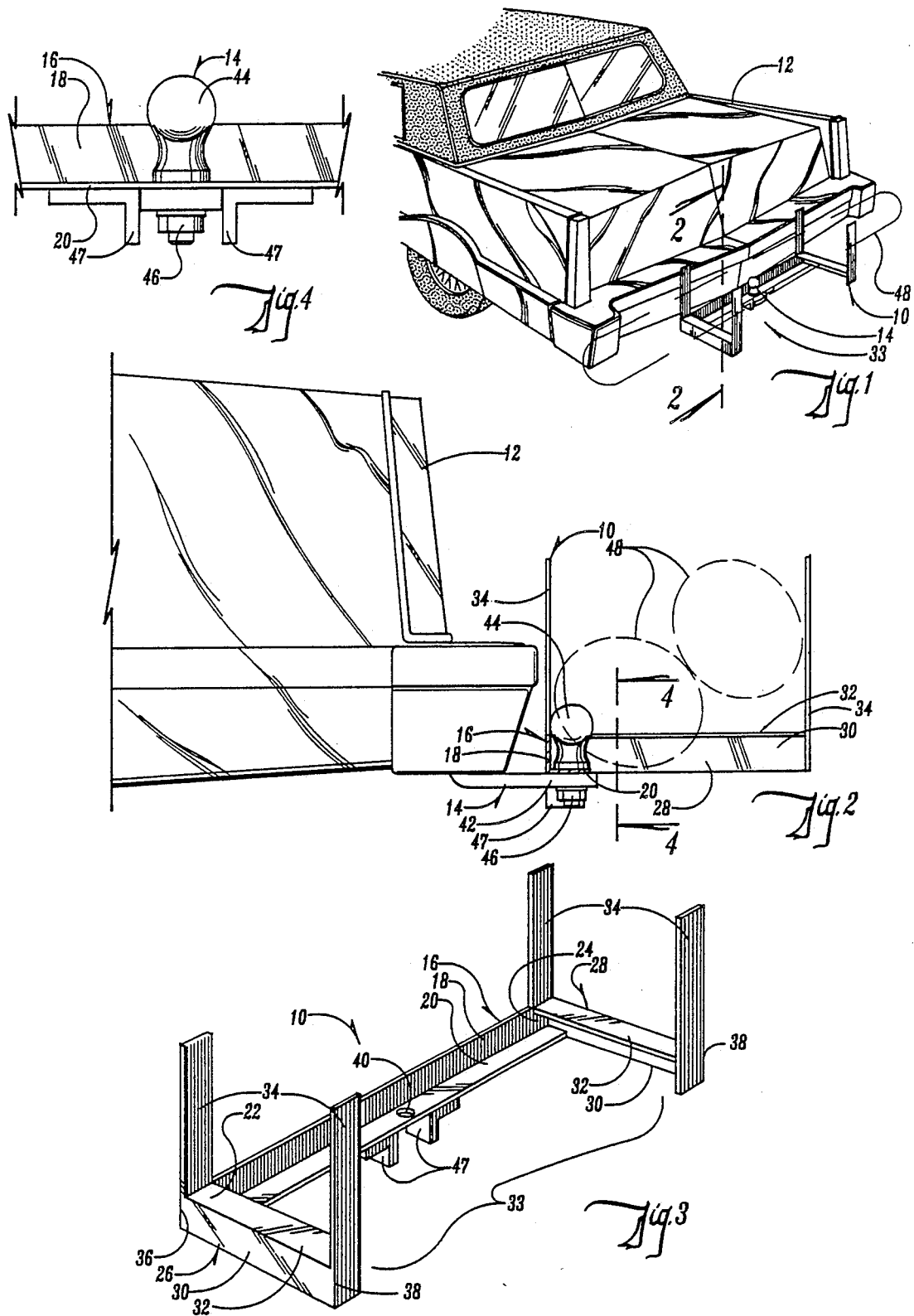

CARRIER FOR TRANSPORTING OBJECTS ON A MOTOR VEHICLE

BACKGROUND OF THE INVENTION

This invention relates to a carrier and method of using the same in order to transport objects on a motor vehicle. The carrier is especially useful in transporting skis and other elongated objects.

Examples of means of transporting objects by vehicle include placing the objects in the trunk, interior of the vehicle, strapping to the roof of the vehicle, or towing behind. These means can be cumbersome and will not work with large or unusually shaped objects. Especially difficult is the problem of transporting elongated objects such as skis. Current methods used to transport skis primarily involve mounting the skis on the top of the motor vehicle. This has a number of disadvantages, which include potential damage to the car and its painted surface from the ski rack. Such ski racks are often not easy to install, and placing the skis in the ski racks can be a difficult process. Mounting the long objects on top of the motor vehicle also increases wind drag on the car, and thereby increases gas mileage. Another method used for transporting skis is to mount the skis vertically at the back of the vehicle. Since the top part of the skis often are above the motor vehicle, this also will cause wind drag. It also partially obscures the rear view of the driver of the vehicle. Such devices are not easily stored when not in use.

Further, many of the ski racks require that the skis be removed from their protective casing in order to be mounted on the rack.

Accordingly, it is an object of this invention to provide for a carrier for skis and other objects on motor vehicles and a method of using the same.

Another object of the invention is to provide for a carrier and method of using the same for transporting skis and other objects which does not cause damage to the motor vehicle.

Still another object of the invention is to provide for a carrier for skis and other objects on motor vehicles and method of using the same in which the carrier is easy to install.

Yet another object of the invention is to provide for a carrier and method of using the same in which the skis and other objects are easy to load onto the carrier.

A still further object of the invention is to provide for a carrier on motor vehicles and method of using the same when transporting skis and other objects which does not increase wind drag on the motor vehicle.

Another object of the invention is to provide for a carrier for transporting skis and objects on motor vehicles which is aesthetically pleasing.

An object of the invention is to provide for a carrier for transporting skis and objects which is easy to store.

A still further object of the invention is to provide for a carrier for transporting skis and objects which may be used on any type of motor vehicle or motor home.

Further objects of the invention will become evident through the following disclosure.

SUMMARY OF THE INVENTION

The invention relates to a carrier for transporting skis and objects on a motor vehicle which includes a base comprised of a cross bar, and a first and second arm extending laterally in the same direction from either end of the supporting means. One or more legs extend upward from the base to prevent the skis or other objects from falling off. In the cross bar, there preferably is a hole centrally therethrough and at the bottom of the cross bar a pair of abutments. The device is then attached to a conventional trailer hitch of the motor vehicle via the mounting shaft of the trailer hitch ball passed through the hole, with the abutments helping to stabilize the device on the hitch.

BRIEF DESCRIPTION OF THE DRAWINGS

FIG. 1 is a perspective view of the device of this invention attached to a motor vehicle.

FIG. 2 is a side sectional view taken along line 2—2 of FIG. 1 showing the device of this invention while attached to a motor vehicle.

FIG. 3 is an enlarged perspective view of the device of this invention.

FIG. 4 is a partial front plan view taken along line 4—4 of FIG. 2 of a mounting means of the device of this invention.

DETAILED DESCRIPTION OF THE INVENTION

The carrier of this invention is generally shown at 10 and may be used to transport any object. It is particularly useful to transport skis, or other elongated objects such as golf clubs, lumber or the like. While carrier 10 may be made of any suitable material, the carrier preferably is made of steel to have sufficient strength for transporting elongated and heavy objects In FIG. 1, carrier 10 is shown attached to motor vehicle 12 by engaging the trailer hitch 14 of the motor vehicle 12. The device itself may be most fully seen in FIG. 3. The carrier 10 includes a cross bar 16, which may take various shapes, and is shown to be L-shaped in cross-section, having an upper portion 18 and a lower portion 20. The cross bar 16 has a first end 22 and second end 24. Extending rearwardly from first end 22 of support means 16 is a first arm 26. Extending rearwardly from second end 24 of support means 16 is a second arm 28. Second arm 28 is positioned parallel to first arm 26. First arm 26 and second arm 28 may take any of a variety of forms as long as the members are capable of holding the elongated object In this embodiment both first arm 26 and second arm 28 are L-shaped in cross-section and include an upper portion 30 and a lower portion 32. The L-shaped arms are positioned so that upper portions 30 provide a flat surface which can support the object to be carried. Other embodiments include forming the arms 26, 28 on cross bar 16 from square or round tubing. Many other such variations are evident to those skilled in the art.

Together, cross bar 16 and arms 26 and 28 form the base 33. The carrier 10 is provided with at least one leg 34 extending upwardly from the base 33. The legs 34 serve the purpose of preventing the elongated object from falling off after being placed on the carrier 10. It will be obvious to those skilled in the art that there may be many different variations upon the placement and number of legs 34. In the embodiment which is shown, four legs 34 are provided, with one pair of legs 34 located at each forward end 36 of first arm 26 and second arm 28. A second pair of legs is located at rearward end 38 of first arm 26 and second member 28. It is also possible to provide one long leg spanning from rearward end 38 of first arm 26 to rearward end 38 of second arm 28.

Other variations may occur in placement of one or more legs to keep objects from falling off.

Any of a variety of mounting mechanisms may also be employed to attach the carrier 10 to motor vehicle 12. The preferred embodiment is shown in the drawings A hole 40 extends centrally through lower portion 20 of cross bar 16. This allows attachment to the motor vehicle 12 by connecting the device with a conventional trailer hitch 14. The trailer hitch 14 is shown as including a tongue 42 having a hole therethrough (not pictured). A ball hitch 44 passes through the hole in the tongue 42 and is mounted on tongue 42 by a nut 46. To mount the carrier 10, one need only align the hole 40 in cross bar 16 with the hole in the tongue 42, passing ball hitch 44 through both holes and secure the carrier 10 to the trailer hitch 14 by threading nut 46 onto ball hitch 44. In the embodiment shown, abutments 47 are placed on either side of hole 40 in cross bar 16 to engage opposite sides of tongue 42. These abutments provide for stability for carrier 10.

The device is shown in use in FIGS. 1 and 2 mounted onto the motor vehicle 12 with skis 48 shown in dotted lines in each Figure. The elongated cross bar 16 is shown having a width less than that of the motor vehicle and its trunk. As a result, it may be stored by simply detaching the carrier 10 from the hitch 14 and placing the carrier in the vehicle trunk.

The foregoing is presented as a means of illustrating an embodiment of the device, and adaptations and variations will be apparent to those skilled in the art.

Thus, it can be seen that the invention accomplishes at least all of its objectives.

I claim:

1. A device for carrying objects on a motor vehicle having a body and bumper, the motor vehicle having a trailer hitch, the device comprising:
   a base comprising a cross bar having opposite ends and first and second arms extending rearwardly substantially in a plane from the opposite ends of the cross bar;
   at least one leg extending upwardly from said base to prevent the objects from falling off the device; and
   said cross bar having a centrally located hole providing a single point of attachment of the device to the motor vehicle, the device when mounted on the motor vehicle not contacting the body or bumper of the vehicle.

2. The device of claim 1 wherein said first arm and second arm each have two opposite ends and said at least one leg comprising a leg extending upwardly from each of said ends of said first and second arms.

3. The device of claim 1 wherein said cross bar is elongated and L-shaped in cross-section, having an upper portion and a lower portion.

4. The device of claim 3 wherein said hole is in said lower portion of said L-shaped cross bar.

5. The device of claim 4 wherein said lower portion of said L-shaped cross bar has a top surface and bottom surface, said bottom surface having adjacent said hole a pair of abutments to assist in securing said device to said motor vehicle.

6. The device of claim 1 wherein each of said first arm and second arm is L-shaped in cross-section.

7. The device of claim 1 wherein said cross bar has a width less than the width of said motor vehicle.

8. The device of claim 6 wherein said first arm and second arm each have an upper and lower portion, said lower portion having an upper and lower end, said upper portion extending laterally from said upper end of said lower portion to form a supporting surface for said object.

9. The device of claim 1 wherein said first and second arms extend in a horizontal plane from the opposite ends of the cross bar.

10. The device of claim 4 wherein said trailer hitch includes a ball hitch, said hole in said lower portion of said L-shaped member is of a size and shape to allow said ball hitch to be placed through said hole in said lower portion of said L-shaped member for connection of said device to said trailer hitch.

11. The device of claim 1 wherein said base is a size and shape to support skis without said skis falling off said device.

12. The device of claim 1 wherein the means for detachably mounting the device to the motor vehicle is integral with said cross bar.

13. A method of carrying objects on a motor vehicle having a trailer hitch with a hole therethrough comprising:
   detachably attaching to the motor vehicle a base comprising an elongated cross bar having opposite ends, first and second arms extending rearwardly from the opposite ends of the cross bar and at least one leg extending upwardly from said base;
   placing the hitch through a hole in the cross bar and the hole in the trailer hitch; and
   placing said objects on said cross bar and first and second arms so that said leg prevents the objects from falling off.

14. The method of claim 13 wherein skis are placed on said cross bar and said first and second arms.

15. The method of claim 13 wherein said motor vehicle has a storage area and said device has a width less than the width of the motor vehicle, and further comprising detaching said device and storing it in said storage area.

* * * * *